United States Patent [19]  [11] 4,102,211
Amortegui  [45] Jul. 25, 1978

[54] FORCE TRANSMITTING MEANS

[76] Inventor: Carlos Amortegui, 1116 Wilmington St., Opa Locka, Fla. 33054

[21] Appl. No.: 775,732

[22] Filed: Mar. 9, 1977

Related U.S. Application Data

[63] Continuation-in-part of Ser. No. 632,475, Nov. 17, 1975, abandoned.

[51] Int. Cl.² ............................................. F16H 21/14
[52] U.S. Cl. ........................................................ 74/66
[58] Field of Search ............................................ 74/66

[56] References Cited

U.S. PATENT DOCUMENTS 659,993  10/1900  Stewart ................................. 74/66
808,253  12/1905  Patten ................................... 74/66

FOREIGN PATENT DOCUMENTS 102,171  7/1924  Austria ................................. 74/66

Primary Examiner—Benjamin W. Wyche
Assistant Examiner—Wesley S. Ratliff, Jr.

[57] ABSTRACT

A force transmitting means which includes a first plurality of eccentrically arranged wheels which are of equal diameter and equi-angularly spaced on a drive shaft and a driven shaft having a plurality of wheels arranged thereabout and a pressure element eccentrically arranged and equi-angularly spaced spanning adjacent wheels at a common radial distance; and a lever pivotally connected between the shafts so that a longer arm portion is in sliding engagement with the periphery of the first mentioned wheels and a shorter arm is in abutting engagement with one of the pressure elements, so that when the larger wheel is turned, the shaft on which the smaller wheels are mounted will be driven.

1 Claim, 6 Drawing Figures

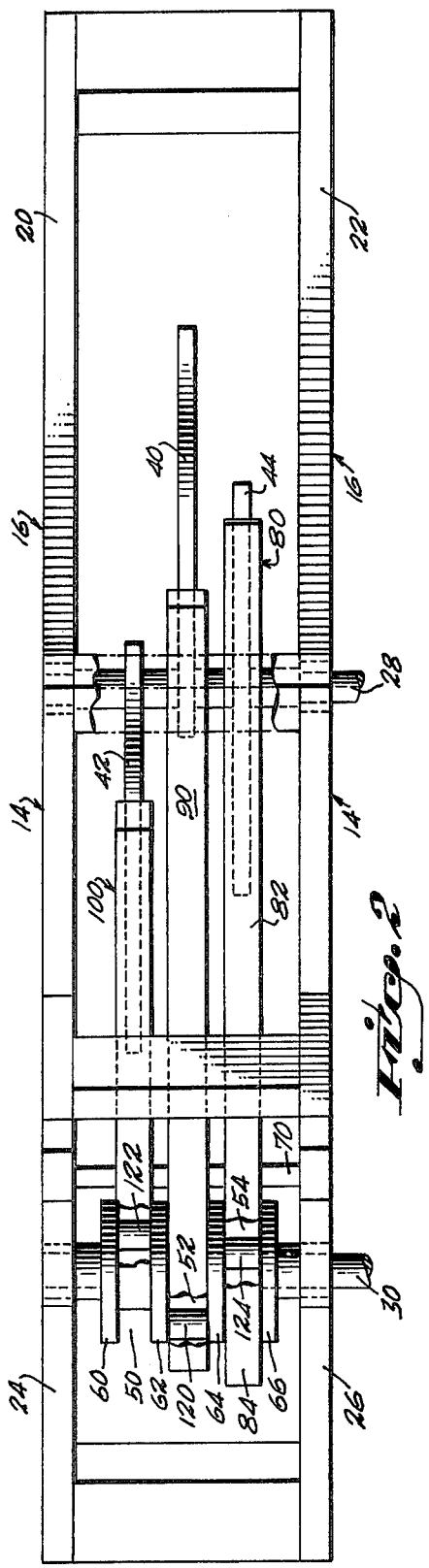
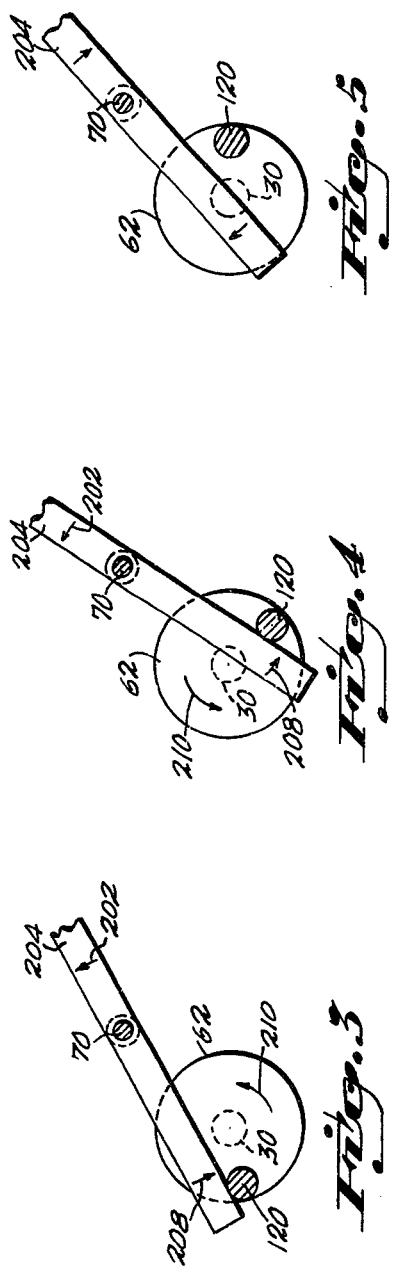

FORCE TRANSMITTING MEANS

FIELD OF THE INVENTION

This application is a continuation-in-part of Ser. No. 632,475, filed Nov. 17, 1975, now abandoned.

This invention relates to an improved force transfer device.

BACKGROUND OF THE INVENTION

It is often necessary to cause force which is delivered by a source to be transferred from one shaft to another shaft. This is of an improved force transmitting means for transmitting force from a driving shaft to a driven shaft.

It is, accordingly, an object of this invention to provide an improved force transfer device which is simple in construction, inexpensive to manufacture and which is adapted to transfer power from one shaft to another shaft.

DESCRIPTION OF THE DRAWINGS

FIG. 2 is a top plan view of the instant invention;

FIGS. 3, 4, 5 and 6 are, respectively, diagrammatic views illustrating the operation of the instant invention as described more fully hereinafter.

DESCRIPTION OF THE PREFERRED EMBODIMENT

Figure 1:
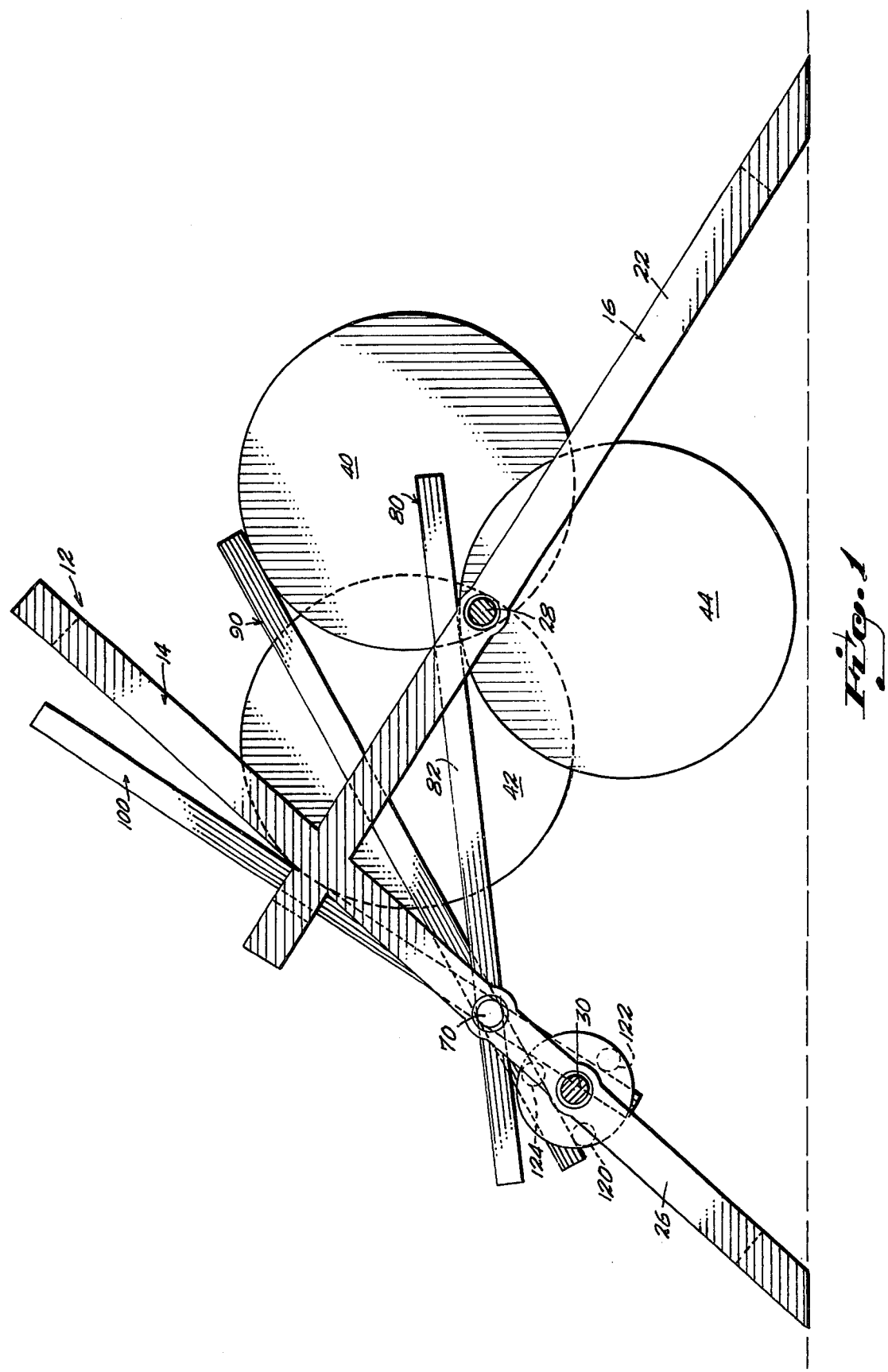
FIG. 1 is a plan view of the instant invention.

Referring to the drawings wherein like reference characters designate like or corresponding parts throughout the several views there is shown in FIG. 1 a frame for the device which is generally designated by the numeral 12. It includes a first pair 14 and a second pair 16 of bifurcated legs, the legs being designated by the numerals 20 and 22 in the first pair and 24 and 26 in the second pair. The first pair of legs is spanned by a drive shaft 28, while the second pair of legs is spanned by a driven shaft 30. To the drive shaft 28 there are a plurality of equiangularly spaced and axially spaced wheels 40, 42 and 44 which are of equal size and keyed for rotation with the shaft. On the driven shaft there are a plurality of wheels, which define therebetween sockets or spaces designated by the numerals 50, 52 and 54. These wheels are designated by the numerals 60, 62, 64 and 66 and are keyed for rotation with the second driven shaft 30. Spanning adjacent wheels a pressure member is provided each being in eccentric relation and the members being equi-angularly spaced with respect to one another and in opposite registry with respect to the wheel drive wheel in generally coplanar relation with it. Spanning the second pair of legs a pivot 70 is provided between the shaft levels which serves as a fulcrum for levers now to be described.

A first lever 80 is provided having a longer arm 82 and a shorter arm 84. The longer arm 82 is in peripheral engagement with one of the wheels as indicated in FIG. 2. Two other levers axially spaced 90 and 100 are also provided, each of which, also, includes a longer arm and a shorter arm. In each case the longer arm is in engagement with the peripheral surface of one of the wheels of the drive shaft and is at all times above a line joining the shafts. The shorter lever arm of each lever engages one of the pressure members spanning each socket, the pressure members being designated by the numerals 120, 122 and 124.

In operation, when one of the wheels keyed to the drive shaft is raised as indicated by the arrow 202 in FIG. 3, the longer lever portion 204 will be forced in a seesaw action about the pivot 70 exerting a downward force as indicated by the arrowed line 208 which bears against a pressure member such as 120 exerting a torque force as indicated by the arrowed line 210. This force will continue to be applied, as shown in FIGS. 4 and 5 until the lever is in alignment with a line drawn between the center of the pivot 70 and the driven shaft. At this point, the other drive shaft wheels will cause the same action to take place with respect to the other driven shaft wheels until, as shown in FIG. 5, the lever has completed its cycle. Successively each of the wheels 40, 42, and 44 apply a force in the manner indicated and, thus, when the driving wheel is rotated by a force, this force is transmitted through the levers through the driven shaft and constitutes an improved force transmitting means.

What is claimed is:

1. A force transfer device comprising:
   a frame,
   a first and a second pair of bifurcated legs, each pair extending at an angle with respect to one another,
   a drive shaft spanning said first pair of legs,
   three eccentric wheels of common diameter equiangularly fixed to said shaft and equi-spaced from one another on said shaft and keyed for rotation with said shaft,
   a driven shaft spanning the second pair of legs and a plurality of wheels on said shaft of a diameter less than said eccentric wheels and spaced from one another defining a plurality of adjacent axially spaced annular slots therebetween,
   pivot means spanning said second pair of legs above said driven shaft; and
   lever means pivotally connected to said pivot means and comprising a plurality of levers, each lever including a first portion in one of the slots between said wheels of said driven shaft and each lever including a second portion extending into peripheral engagement with one of said eccentric wheels, whereby when the eccentric wheels are rotated by operator means arranged to drive the drive shaft, the lever means exert a torque on the driven shaft.

* * * * *